United States Patent
McNeel et al.

(10) Patent No.: US 6,412,397 B1
(45) Date of Patent: Jul. 2, 2002

(54) APPARATUS AND METHOD FOR MAKING STACKABLE TORTILLA CHIPS

(75) Inventors: Todd Charles McNeel, Flower Mound; Nelson Shih-Hsun Chen, Frisco; Lawrence Alan Graham, Corinth, all of TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/998,663

(22) Filed: Dec. 3, 2001

Related U.S. Application Data (62) Division of application No. 09/499,042, filed on Feb. 7, 2000.

(51) Int. Cl.[7] ............................ A23L 1/00; A47J 37/00; A47J 37/12
(52) U.S. Cl. .............................. 99/330; 99/339; 99/353; 99/355; 99/404; 99/407; 99/427
(58) Field of Search .......................... 99/327–333, 339, 99/340, 352–356, 403–410, 411, 426, 427, 443 C, 443 R, 386, 444–450, 477–479; 426/383, 523, 549, 439, 438, 502, 503

(56) References Cited

U.S. PATENT DOCUMENTS

| | | | |
|---|---|---|---|
| 2,144,720 A | * | 1/1939 | Gibson ........................ 426/302 |
| 2,286,644 A | | 6/1942 | Pringle et al. |
| 3,294,545 A | * | 12/1966 | Cunningham et al. ...... 426/560 |
| 3,498,798 A | | 3/1970 | Baur et al. |
| 3,519,432 A | | 7/1970 | Succo et al. |
| 3,576,647 A | * | 4/1971 | Liepa ........................... 426/439 |
| 3,594,187 A | | 7/1971 | Liepa |
| 3,608,474 A | | 9/1971 | Liepa |
| 3,609,939 A | | 10/1971 | Hooper et al. |
| 3,626,466 A | | 12/1971 | Liepa |
| 3,752,676 A | | 8/1973 | Callaham |
| 3,852,485 A | | 12/1974 | Beall |
| 3,857,982 A | | 12/1974 | Sevenants |
| 3,864,505 A | | 2/1975 | Hunter et al. |
| 3,872,752 A | * | 3/1975 | Remde et al. ................. 83/100 |
| 3,905,285 A | | 9/1975 | Campbell |
| 3,935,322 A | * | 1/1976 | Weiss et al. ................. 426/439 |

(List continued on next page.)

FOREIGN PATENT DOCUMENTS

| | | |
|---|---|---|
| GB | 1284283 | 8/1972 |
| WO | WO 99/23893 A1 | 5/1999 |

*Primary Examiner*—Timothy F. Simone
(74) *Attorney, Agent, or Firm*—Rothwell, Figg, Ernst & Manbeck (57) ABSTRACT

An apparatus and method for making uniformly shaped snack food chips which can be stacked for packaging, e.g., in a cylindrical canister or a canister which conforms to the contour or perimeter of the snack food chips. The apparatus features two-part mold cavities in which chip preforms are restrained and transported through hot oil to be cooked. Preferably, the mold cavities are defined between a pair of rotating belts, one lower belt and one upper belt, which together "encase" or "sandwich" and thereby restrain the chips. According to the method, a continuous sheet of dough is toasted and then proofed before being cut into individual chip preforms. The preforms are then placed into the mold cavities and transported through hot oil to be cooked. Vacuum transfer rollers are used to facilitate placement of the chip preforms into the mold cavities and extraction of the cooked chips from the mold cavities.©

10 Claims, 9 Drawing Sheets

U.S. PATENT DOCUMENTS

| | | | |
|---|---|---|---|
| 3,998,975 A | | 12/1976 | Liepa |
| 4,032,664 A | | 6/1977 | Weiss |
| 4,054,015 A | | 10/1977 | Rowell |
| 4,082,176 A | | 4/1978 | Pommer |
| 4,096,791 A | | 6/1978 | Weiss |
| 4,122,198 A | | 10/1978 | Wisdom et al. |
| 4,126,706 A | | 11/1978 | Hilton |
| 4,167,585 A | * | 9/1979 | Caridis et al. .......... 426/523 X |
| 4,269,861 A | * | 5/1981 | Caridis et al. .............. 426/438 |
| 4,282,258 A | | 8/1981 | Forkner |
| 4,325,295 A | * | 4/1982 | Caridis et al. ................. 99/339 |
| 4,366,749 A | * | 1/1983 | Caridis et al. ............ 99/355 X |
| 4,392,420 A | * | 7/1983 | Caridis et al. ................. 99/406 |
| 4,650,687 A | | 3/1987 | Willard et al. |
| 4,738,193 A | * | 4/1988 | Benson et al. ................. 99/404 |
| 4,942,808 A | * | 7/1990 | Benson et al. ................. 99/404 |
| 4,973,481 A | * | 11/1990 | Hunt et al. ................. 426/144 |
| 4,977,821 A | * | 12/1990 | Benson et al. ................. 99/407 |
| 4,978,548 A | * | 12/1990 | Cope et al. ................. 426/439 |
| 4,985,269 A | | 1/1991 | Irvin et al. |
| 5,075,120 A | * | 12/1991 | Leary et al. ................. 426/233 |
| 5,112,633 A | * | 5/1992 | Benson et al. .......... 426/519 X |
| 5,137,740 A | * | 8/1992 | Benson et al. .............. 426/438 |
| 5,167,979 A | * | 12/1992 | Benson et al. .......... 426/490 X |
| 5,188,859 A | * | 2/1993 | Lodge et al. ................. 426/560 |
| 5,193,442 A | | 3/1993 | Moscowitz et al. |
| 5,298,274 A | * | 3/1994 | Khalsa ........................ 426/560 |
| 5,407,692 A | * | 4/1995 | Caridis et al. .............. 426/510 |
| 5,464,643 A | | 11/1995 | Lodge |
| 5,503,673 A | | 4/1996 | Berta |
| 5,505,978 A | * | 4/1996 | Roy et al. .................... 426/549 |
| 5,531,156 A | | 7/1996 | Brummett |
| 5,565,220 A | | 10/1996 | Rubio et al. |
| 5,576,041 A | | 11/1996 | Clow et al. |
| 5,652,010 A | * | 7/1997 | Gimmler et al. ............. 426/549 |
| 5,667,834 A | | 9/1997 | Rubio et al. |
| 5,687,641 A | | 11/1997 | Williamson et al. |
| 5,697,748 A | | 12/1997 | Somekh et al. |
| 5,846,589 A | * | 12/1998 | Baker et al. ................. 426/439 |

\* cited by examiner

APPARATUS AND METHOD FOR MAKING STACKABLE TORTILLA CHIPS

This application is a divisional of Ser. No. 09/499,042, filed Feb. 7, 2000, pending.

FIELD OF THE INVENTION

The present invention relates generally to an apparatus and method for making snack food chips. More particularly, the invention relates in one aspect to an apparatus and method for making curved corn-based or other snack food chips which can be packaged neatly and compactly in a stacked arrangement, e.g., in a canister or other sleeve-type container which preferably conforms generally to the contour or perimeter of the snack food chips; and in another aspect the invention relates to an apparatus and method for making ridged or sinusoidally wavy snack food chips.

BACKGROUND OF THE INVENTION

In general, snack food chips of various varieties possess characteristic shapes. For example, tortilla chips are one of the more popular types of snack food products and have come to be associated with having a triangular shape. Additionally, snack food chips which are used for dipping, e.g., potato chips, tortilla chips, or corn chips, preferably are curved to enhance the scooping ability of the chip as well as to add strength to the chip. Alternatively, chip strength may be enhanced by making the snack food chips ridged or sinusoidally wavy.

With respect to packaging, a stacked arrangement of snack food chips, e.g., in a cylindrical canister, has been found to be popular for a number of reasons. Such canisters purportedly offer some degree of protection against breakage of the snack food product and, due to the compact nature of the stacked arrangement of the chips, they provide greater transportability of the snack food products, both in terms of bulk transport (i.e., large cartons of the canisters being shipped, e.g., from the manufacturer to the retailer) as well as the individual consumer being able to transport a single package of chips (e.g., in a purse or in a picnic basket). Additionally, the extended shelf life of a sealed canister of snack food chips as compared to a bag (commonly pillow-shaped and frequently sealed with a generally inert gas to prevent product degradation), as well as the ability to reseal a canister with a snap-fit-type lid once the canister has been opened, makes a canister an attractive packaging option.

In the past, however, it has not been feasible to package a uniform stack of snack food chips such as tortilla chips in such canisters. This is because the conventional method of making snacks like tortilla chips has been simply to fry a large quantity of tortilla chips unconstrained in a fryer of cooking oil, with paddles or other means used to submerge the chips for thorough cooking and to move the chips through the oil. The chips are removed continuously from the oil in a random and non-uniform configuration. In an unconstrained environment, the chips can take on uncontrolled variations in shape, such as by folding over on themselves or partially bending. In addition, the lack of control over individual chips as they exit the fryer made it essentially impossible to package snack food chips such as tortilla chips, as previously and commonly made, in a stacked configuration such as in a canister or other sleeve-type container.

Additionally, in the past it has been difficult to impart "large-scale" or "macroscopic" texture to tortilla chips, e.g., by making them wavy. (In this context, "large-scale" or "macroscopic" texture refers to the texture or shape of the chip overall and is in contrast to "surface-level" texture which may be provided, e.g., by blistering of the surface of the chips.) This difficulty was due primarily to the tacky nature of the corn dough or masa from which tortilla chips traditionally are made.

SUMMARY OF THE INVENTION

The present invention provides apparatus and methodologies for making snack food chips such as corn chips—tortilla chips in particular and curved tortilla chips even more particularly—which can be packaged in a stacked configuration in a canister or other sleeve-type container which preferably conforms generally to the contour or perimeter of the snack food chips. In particular, the invention features a fryer apparatus which cooks the tortilla chips by transporting them through a fryer of cooking oil while constrained within continuous, preferably two-piece semi-closed molds. Preferably, the apparatus includes a pair of belts which mate to define the molds, one belt consisting of links which define concave, lower mold cavities and the other belt consisting of links which form convex retaining protuberances which restrain the tortilla chips in the mold cavities. A die-cutting vacuum transfer wheel is used to cut tortilla chip preforms (uncooked tortilla chips) from a continuous, toasted, proofed sheet of corn masa and place the preforms into the mold cavities in the lower belt assembly. A vacuum transfer wheel is also provided downstream, at the exit end of the fryer apparatus, to transfer the now-cooked tortilla chips from the mold cavities to a take-away conveyor which transports the tortilla chips to be seasoned, if desired, and ultimately to a packaging station—doing so in a manner which maintains the regular orientation of the chips that is necessary to be able to stack them for packaging.

In other aspects, the invention features methodologies which enable form-frying of tortilla chips in semi-closed, constrained molds in regular order so as to produce uniformly shaped chips that can be stacked for packaging. Thus, in one methodological aspect, the invention features placing tortilla chip preforms into a first mold section; constraining the tortilla chip preforms in the first mold section by enclosing them in the mold using a mating second mold section and immersing the tortilla chip preforms in hot oil to cook them. The tortilla chip preforms are loaded into the molds in a regular or uniform arrangement, and they are removed from the molds and processed subsequent to their being fried while maintaining the regular or uniform arrangement. This permits them to be stacked for packaging. Preferably, the tortilla chips are transported through the hot oil, e.g., by means of a belt configuration. This permits the tortilla chips to be cooked on a continuous basis instead of on a batch basis (which also is deemed to be within the scope of the invention).

In another methodological aspect, the invention features a departure from conventional pre-processing of tortilla chips, in which conventional pre-processing corn masa is first cut into the raw tortilla chip preforms which are then toasted and proofed to bring the moisture content of the preforms to a required level before they are cooked in oil. According to this aspect of the invention, the corn masa is sheeted then toasted and proofed before being cut into the individual tortilla chip preforms and cooked, e.g., in enclosed molds. This order of the process steps is used in particular when the tortilla chips are to be packaged in a uniform, stacked arrangement because it was found that uniform orientation of the tortilla chip preforms—which is necessary in order to be able to transfer the tortilla chip preforms repeatedly and reliably into the molds and then subsequently to be able to stack and package the cooked chips—could not be maintained if the tortilla chip preforms were cut from the relatively sticky or tacky corn masa sheet before being toasted and proofed. Thus, to a relatively large extent, toasting and proofing the corn masa sheet before die-cutting the tortilla chip preforms is the step which enables stackable tortilla chips to be manufactured efficiently and on a commercially viable scale.

Additionally, toasting and proofing the sheet of masa makes it feasible to provide, on a commercially viable scale, "macroscopic" texture to the tortilla chips, e.g., by passing the sheet of masa through one or more corrugated rollers, check rollers, embossing rollers, waffle cut rollers, or other forming step after it has been toasted and proofed and before it is die-cut to produce the chip preforms. Again, it is the reduction in stickiness or tackiness occasioned by toasting and proofing that renders this processing step commercially feasible. When so shaping the chip preforms, it may be desirable to forego the subsequent molding of the chip preforms (by, for example, frying them in mold cavities as described above); in that case, the chip preforms could be baked or fried unrestrained, in a manner as is known in the art.

BRIEF DESCRIPTION OF THE DRAWINGS

The invention will now be described in greater detail in connection with the drawings, in which.

DETAILED DESCRIPTION OF PREFERRED EMBODIMENTS

Figure 1:
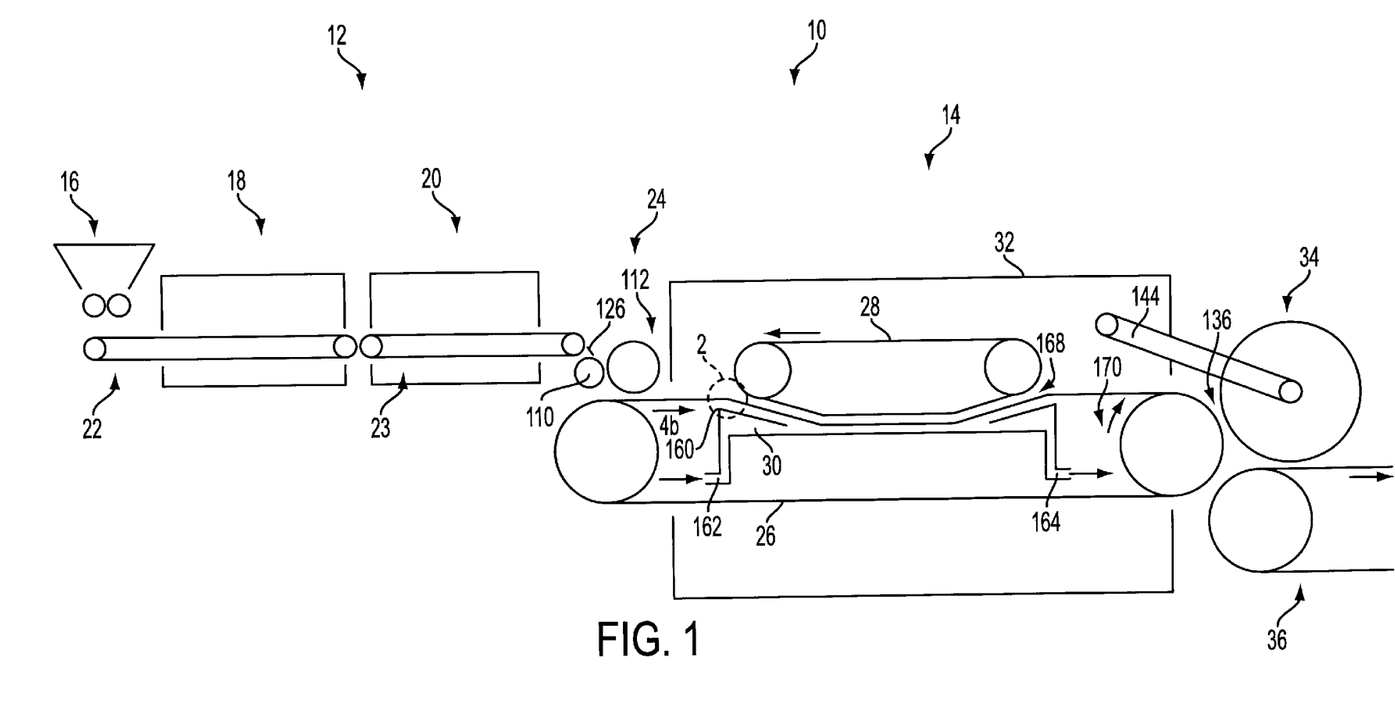
FIG. 1 is diagrammatic, side elevation view depicting tortilla chip-making apparatus according to the invention.

An installation 10 for making stackable tortilla chips according to the invention is shown in FIG. 1. In general, the installation has two major sub-installations: pre-processing apparatus 12 and the tortilla chip frying apparatus 14.

The pre-processing apparatus 12 includes sheeting apparatus 16, toasting oven 18, proofing oven 20, and conveyor apparatus 22, 23. The sheeting apparatus 16 may be conventional, or it may be configured to produce whole sheets of masa using an ultrasonic scraper to separate the sheet from the rollers, as described in co-pending U.S. patent application Ser. No. 09/418,495, filed Oct. 15, 1999 and entitled "Ultrasonic Full-Width Sheeter." The toasting oven 18, proofing oven 20, and conveyor apparatus 22, 23 are generally conventional. A transfer assembly 24 is located between the pre-processing apparatus 12 and the fryer apparatus 14.

The primary components of the tortilla chip frying apparatus 14 include a lower, mold cavity belt assembly 26; a cooperating or mating upper, mold plate belt assembly 28; and an oil pan assembly 30, all housed within housing 32. A downstream transfer assembly 34 transfers the cooked tortilla chips from the mold cavities of the lower belt assembly 26 to a take-away conveyor 36, which transports the tortilla chips downstream for post-processing (which includes light re-oiling and seasoning, if desired) and subsequent packaging. (Apparatus which may be used to package tortilla chips produced using the apparatus and methods of the present invention is disclosed in co-pending U.S. patent application Ser. No. 09/326,682, filed Jun. 7, 1999 and entitled "Apparatus and Method for Stacking Tortilla Chips.")

Figure 2:
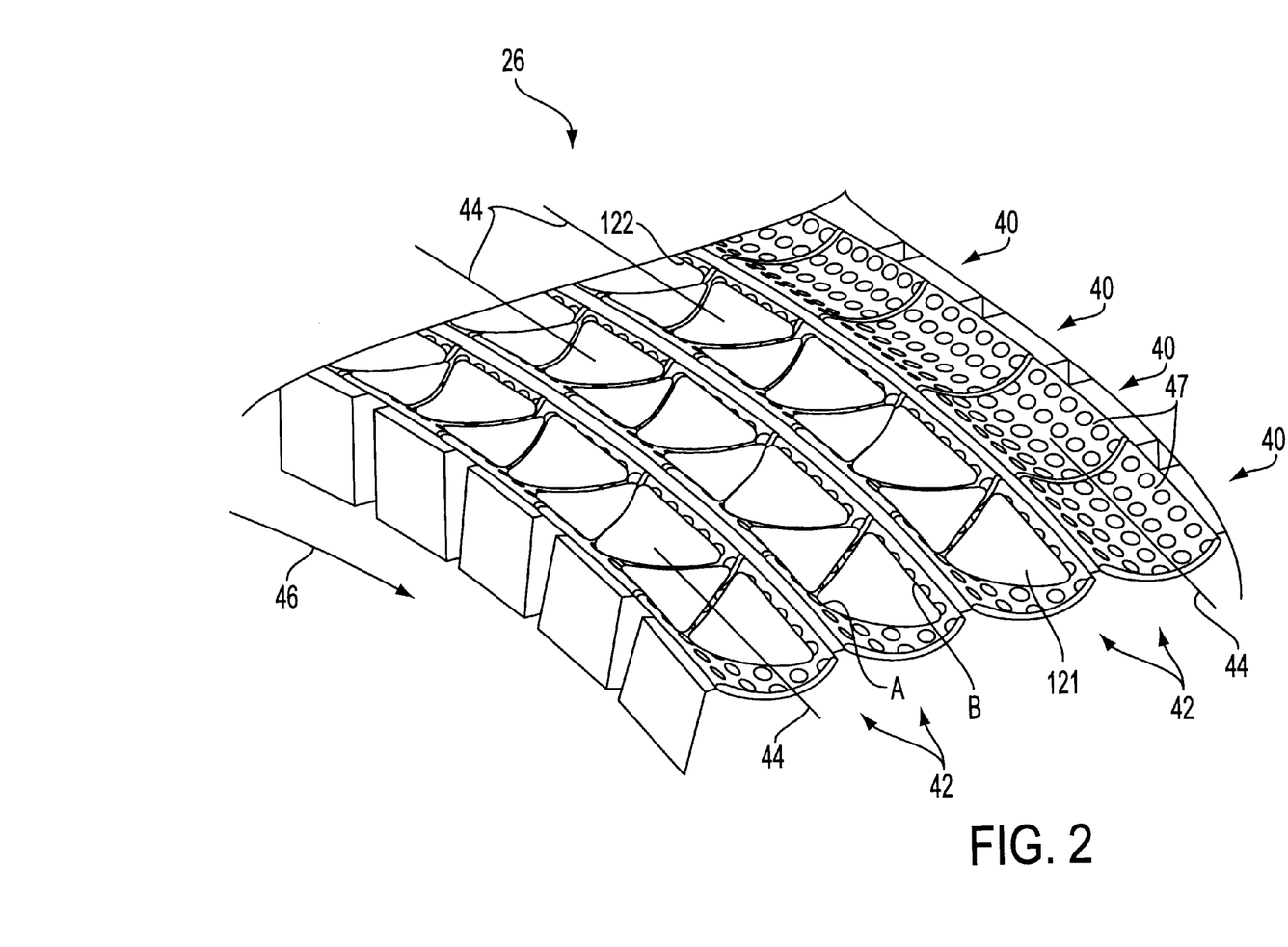
FIG. 2 is a perspective view illustrating the lower, mold cavity conveyor assembly in the circled region labeled 2 in FIG. 1.

The construction of the lower and upper belt assemblies 26 and 28 is illustrated in greater detail in FIGS. 2–5. As illustrated in FIG. 2, which is a close-up view of the circled portion of the lower, mold cavity belt assembly 26 at the point where the belt assembly begins to drop down into hot oil contained within the oil pan 30, the lower, mold cavity belt assembly is composed of a number of transversely extending mold cavity "links" 40 which are connected together to form the continuous belt 26. The mold cavities 42 are formed as continuous, longitudinally extending (in terms of the running direction of the belt assembly, indicated by arrow 46), trough-shaped depressions. The mold cavities 42 are curved about longitudinally extending axes 44 but, locally, are relatively straight or non-curved in the longitudinal direction. In other words, the only longitudinal curvature is attributable to the belt flexing, and that curvature is essentially absent over the length of the portion of the belt disposed within the oil pan.)

The links 40 of the belt assembly 26 are each constructed with a number of individual mold cavity elements 47. The mold cavity elements are formed from perforated, preferably electro-polished stainless steel (to prevent the masa from sticking), on the order of 0.25 inch (6.35 mm) thick, that is bent into a "lazy M" configuration, and the mold cavity elements are fastened together in side-by-side fashion as shown more clearly in FIG. 3. The perforations should be large enough to allow hot oil to reach the product to cook it and for steam to escape.

Figure 3:
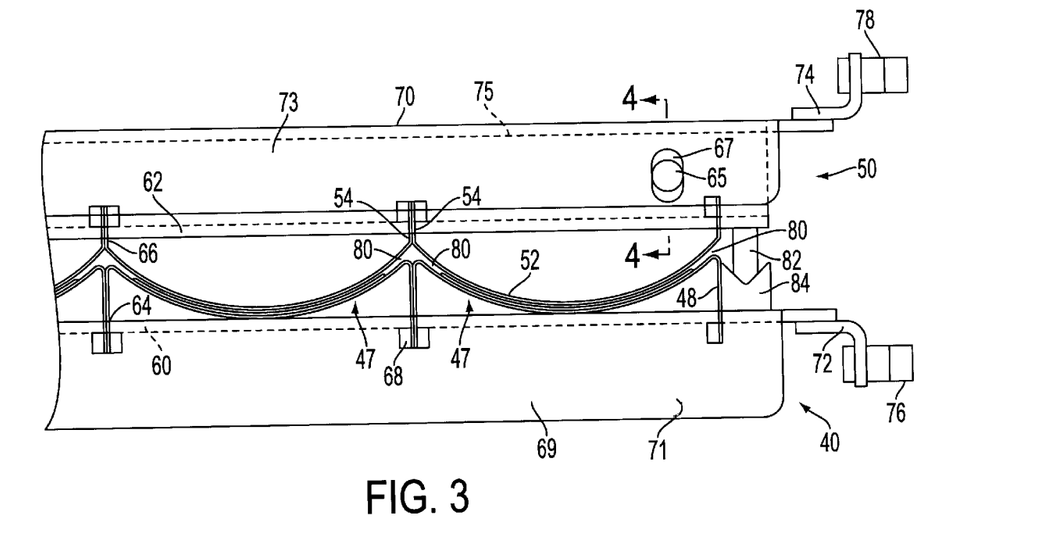
FIG. 3 is a diagrammatic, face-on view showing the end portion of the links of the lower and upper belt assemblies shown in FIG. 1 making mating engagement.

FIG. 3 also illustrates the construction of the upper, mold plate belt assembly 28, which mates with the lower, mold cavity belt assembly 26. The mold plate assembly 28 is also comprised of a series of links 50 which are connected together to form the continuous belt 28. Similar to the links 40, the links 50 are constructed from convex, arch-shaped mold plate elements 52, which are fastened together in side-by-side fashion by the parallel leg portions 54 thereof. Like the mold cavity elements 47, the arch-shaped mold plate elements 52 preferably are fabricated from perforated, electro-polished stainless steel on the order of 0.25 inch (6.35 mm) thick.

The mold cavity element-supporting structure of each of the links 40 is fabricated from sheet metal such as stainless steel. It is formed so as to have a flat, transversely extending support member 60 with slots 64 therein through which the legs 48 of the mold cavity elements extend, with the elements being secured thereto by appropriate retaining means 68, and downturned front and rear flanges 69, 71 (hidden in FIG. 3). The support member 60 extends laterally to the very end of the link assembly, beyond the flanges 69, 71. Mounting brackets 72 are attached to the lateral ends of the support member 60 and have bearing assemblies 76 which support and guide the lower belt assembly in appropriately configured tracks installed within the housing 32 (not shown).

The links 50 of the upper, mold plate belt assembly 28 have a two-part configuration which allows the arch-shaped mold plate elements 52 to "float" somewhat relative to the mold cavity elements as the belts merge together. As shown in greater detail in FIG. 4, the links 50 each include a stainless steel upper bracket member 70 and a stainless steel lower, mold plate element-support bracket member 62 which fits within the flanges 73 of the upper bracket member 70. (The amount of space between the upturned flanges 63 of the lower, mold plate element-supporting bracket member 62 is slightly exaggerated for clarity purposes. The clearance should be large enough to permit a slight amount of rotation of the lower bracket member 62 relative to the upper bracket member 70, about an axis extending transversely to the belt direction, but should be small enough to prevent significant fore-and-aft shifting of the lower bracket member 62 relative to the upper bracket member 70.) The lower, mold plate-supporting bracket 62 is supported by pins 65 which are secured to the upturned flanges 63 and which slide vertically within slots 67 formed within the down-turned flanges 73 of the upper bracket member 70.

Similar to the configuration of the lower links 40, the cross-member 75 between the flanges 73 extends laterally beyond the ends of the flanges, and mounting brackets 74 are attached thereto. The mounting brackets 74 have bearing assemblies 78, which support and guide the upper belt assembly in appropriately configured tracks within the housing 32 (not shown).

As described in more detail below, and as is shown in FIG. 1, the construction and arrangement of the lower and upper mold element belt assemblies is such that the links 50 of the upper, mold plate belt assembly merge with the links 40 of the lower, mold cavity belt assembly as the two belt assemblies rotate. Together, the mold cavity elements 47 and the mold plate elements 52 define a small, longitudinally extending space 80 between them (FIG. 3), and the tortilla chip preforms are restrained within these spaces 80. In other words, the spaces 80 form longitudinally continuous, semi-closed mold cavities that maintain the tortilla chip preforms in uniform arrangement as they are cooked in the hot oil (which is critical to being able to stack them subsequently for packaging).

To ensure proper positioning of the mold elements relative to each other, both in terms of their distance apart from each other and in terms of their relative lateral positioning, a male centering pin 82 is provided on one of the link members and a female centering trough 84, which cooperates with the centering pin 82, is provided on the other of the link members. Proper vertical and lateral positioning of the mold elements is important because having them too close together prevents the masa from expanding as it cooks and can mash the masa into the perforations in the mold elements, thereby preventing subsequent removal of the tortilla chips from the mold assembly; and having them too far apart will allow the tortilla chips to move around within the mold cavities defined by the gap 80, resulting in loss of process control.

Figure 4:
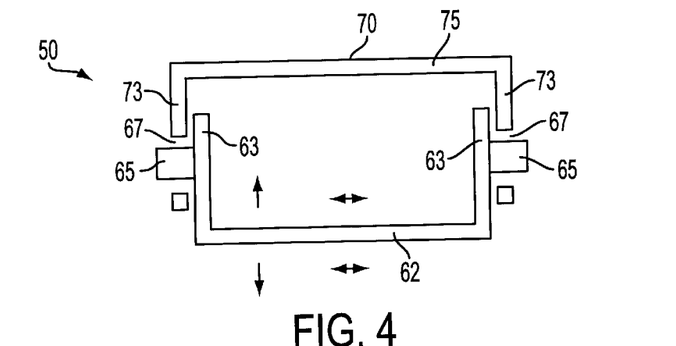
FIG. 4 is a diagrammatic section view along the lines 4—4 in FIG. 3.
Figure 5:
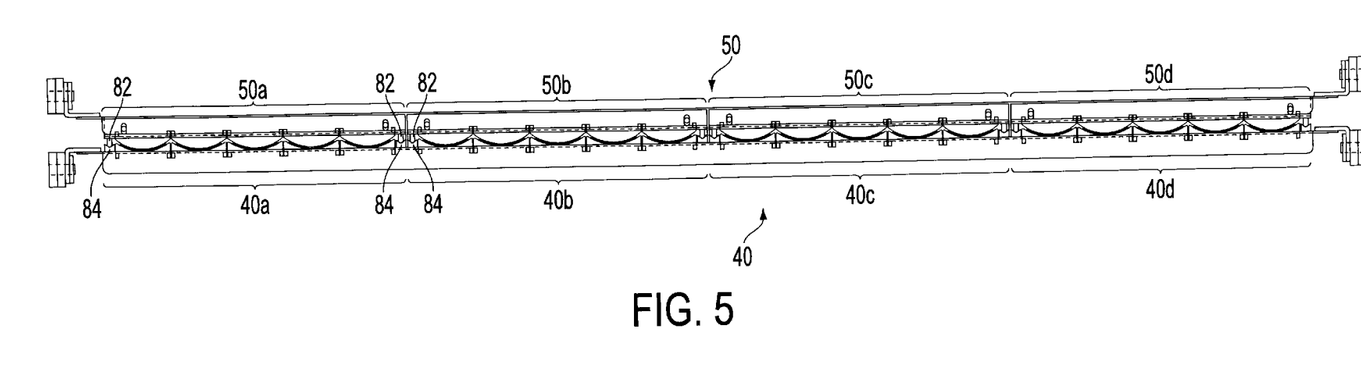
FIG. 5 is a diagrammatic, face-on view similar to FIG. 3 and illustrating construction of the lower and upper belt assemblies on a commercial production scale.

Although FIG. 2 depicts (schematically) just four mold cavity elements 47 across the width of the belt assembly 26, it will be appreciated that for operation on a commercial scale, the link assemblies 26 and 28 may be on the order of sixty-five inches across or more (i.e., laterally or transverse to the traveling direction of the belt), with as many as twenty or more mold cavity elements and mold plate elements per link 40, 50. Preferably, links of such width are constructed with a number of subassemblies, e.g., 40a–40d and 50a–50d, as illustrated in FIG. 5. Each subassembly consists of a number of mold cavity elements or mold plate elements, with a set of centering pins 82 and centering troughs 84 as well as a pair of guide pins 65 and slots 67 for each paired subassembly. This permits the mold plate elements of each subassembly to find their proper positioning more easily than would be the case if all the mold elements on a given link member 40 or 50 (e.g., all twenty, as shown in FIG. 4) were linked together such that all twenty would have to move up and down or side-to-side together.

Figure 6:
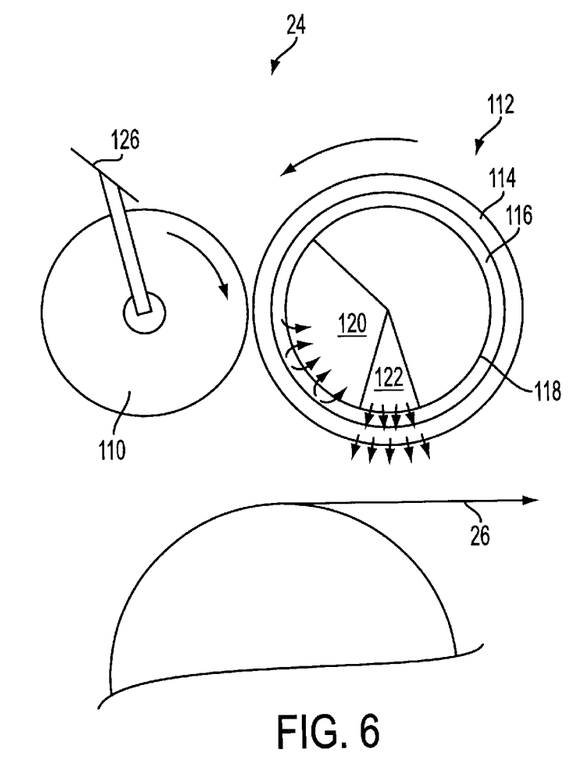
FIG. 6 is a diagrammatic, side elevation view depicting the upstream, die-cutting vacuum transfer assembly shown in FIG. 1.
Figure 7:
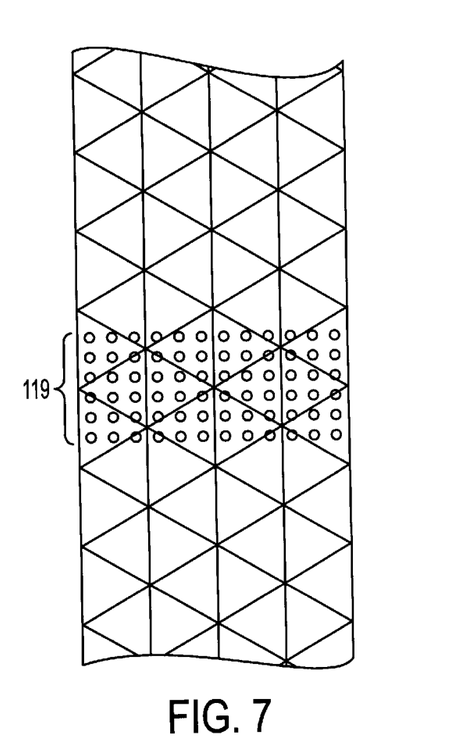
FIG. 7 is a plan view showing the die-cutting ring of FIG. 6 in "unrolled" or "unwrapped" fashion.
Figure 8:
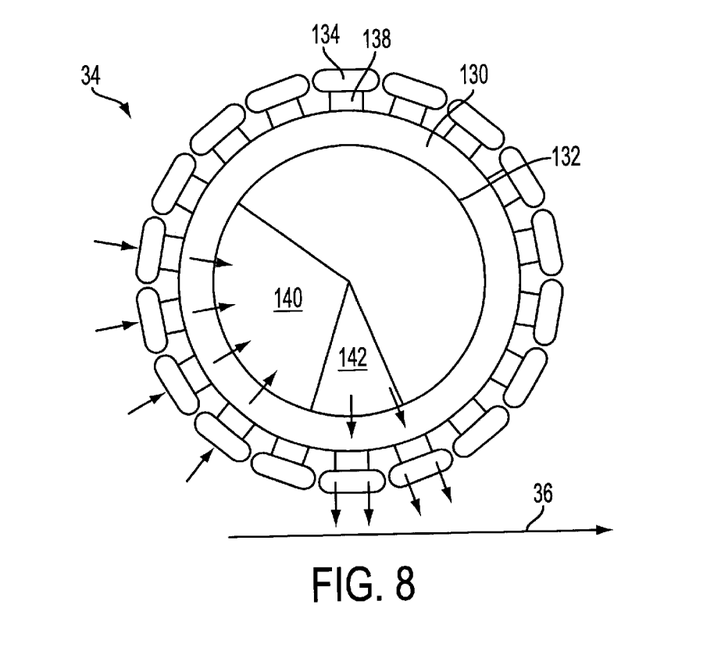
FIG. 8 is a diagrammatic, side elevation view illustrating the downstream vacuum transfer assembly shown in FIG. 1.

Furthermore, in terms of the apparatus of the invention, details of the upstream transfer assembly 24 and the downstream transfer assembly 34 are illustrated in FIGS. 6–8. As illustrated in FIGS. 6 and 7, the upstream transfer assembly 24 is configured to cut the corn masa sheet into individual tortilla chip preforms and to deposit the preforms into the mold cavities of the lower, mold cavity belt assembly 26. To this end, the upstream transfer assembly 24 includes an anvil roller 110 and a die-cutting, vacuum transfer roller 112. The transfer roller has a die-cutting outer ring 114 which is mounted on a support ring 116, which support ring rotates around a central vacuum/pressure drum 118. The support ring is perforated or ducted to permit suction/over-pressurization forces to act through it.

The die-cutting outer ring 114 is constructed with a cutting pattern as shown in FIG. 7. (A few rows of perforations/ducts 119 in the support ring 116 are also shown in FIG. 7; it will be appreciated that the perforations/ducts 119 are present around the entire circumference of the support ring 116.) As a result of this pattern, the die-cutting outer ring 114 cuts the masa sheet into tortilla chip preforms which will be deposited into the channel shaped mold cavities of the lower belt assembly in alternating fashion, as illustrated in FIG. 2. In other words, if the chip preforms are deemed to be curved about the longitudinal axes 44 of the mold cavities, and the edges 122 of the preforms that extend parallel to the longitudinal axes are deemed to be the base edges B and the opposing, upturned corners of the tortilla chip preforms are deemed to be the apex corners A, the tortilla chip preforms will be arranged with the base edges B and the apex corners A of successive chips arranged left-right-left-right and right-left-right-left, respectively.

The central vacuum/pressure drum 118 is constructed with internal chambers and/or manifolds such that constant suction is drawn within region 120, and constant over-pressure is created within region 122. As the die-cutting ring rotates while making bearing contact against anvil roller 110, the die-cutting ring cuts a sheet of masa into the individual tortilla chip preforms. The preforms adhere to the assembly 112 by suction, as indicated by the inwardly pointing arrows in the vacuum chamber 120. As the die-cutting ring 114 continues to rotate and the tortilla chip preforms pass by over-pressure region 122, they are blown (or "air-peeled") off of the vacuum transfer roller 112 and down into the mold cavities of the belt assembly 126, in the alternating arrangement shown in FIG. 2.

Finally, with respect to the upstream transfer assembly 24, a doctor blade 126 is provided to lift the masa sheet from the conveyor apparatus 23 and help guide it onto the anvil roller 110 for die-cutting.

The downstream transfer assembly 34 is illustrated in FIG. 8. The transfer assembly 34 includes a pick-off ring 130 which rotates about stationary vacuum/pressure drum 132. The pick-off ring 130 has pick-off pads 134 distributed around its circumference to lift cooked tortilla chips out of the mold cavities at the downstream end of the belt assembly 26, as at 136 (see FIG. 1). The pick-off pads 134 are perforated and made out of material such as silicone, and are supported on the pick-off ring 130 by pad stands 138, which have air passageways passing through them. Like the vacuum/pressure drum 118, the vacuum/pressure drum 132 has internal manifolds and/or chambers which create constant under-pressure in suction region 140 and constant over-pressure in region 142, which causes the cooked tortilla chips to be suctioned against the pick-off pads 134 and then released down onto the take-away seasoning conveyor 36.

The transfer wheel assembly 34 may be supported by pivot strut 136, which is attached to the housing 32 (see FIG. 1). The pivot attachment permits the roller to be swung away from the hot fryer belt when the system is not in operation.

The apparatus described above operates as follows. Cooked and soaked corn is fed into the sheeting apparatus 16. The corn is wet-milled by the apparatus to form a sheet of masa which, for commercial production intended to produce on the order of three thousand pounds of tortilla chips per hour, is on the order of five feet wide. The masa sheet is deposited onto conveyor apparatus 22, which is fabricated from metal mesh (i.e., the belt is made from "breathable" material). The masa sheet, transported by the conveyor apparatus 22, makes a single pass through toasting oven 18, which has infrared burners above the sheet of masa and open flame burners below the belt. The length of the toasting oven is set so that the masa sheet passes through the toasting oven in approximately twenty seconds, and the burners are controlled such that the temperature inside the oven is on the order of 600° F. The masa residence time and oven temperature essentially are sufficient to "crust over" the masa, i.e., to sear the outside while leaving the interior with a substantial amount of moisture. (This internal moisture will cause the chips to blister when they are fried, which gives the chips a preferred texture.)

Once it exits the toasting oven 18, the masa sheet transitions to conveyor apparatus 23 and enters proofing oven 20. The conveyor apparatus 23 may be made from a plastic mesh material. The proofing oven 20 is maintained at on the order of 200° F., with a relative humidity of approximately 80% maintained by steam injection. The length of the proofing oven is set to achieve a twenty to thirty second dwell time of the masa. This allows the moisture content to equilibrate throughout the sheet of masa, which makes the masa more pliable and facilitates subsequent handling of the tortilla chip preforms when they are cut from the masa sheet, but without making them so pliable as to be unworkable. The masa sheet enters the toasting oven 18 at a moisture content on the order of 50% by weight, and exits the toasting oven and enters the proofing oven at approximately 35% moisture by weight; the moisture content of the masa sheet remains essentially the same as it travels through the proofing oven, but the moisture content and distribution essentially equilibrate, as noted above. (The overall system is designed to deliver a desired level of product through-put, which will determine the frier apparatus dimensions and operating speed; the line speed of the frier apparatus dictates the line speed of the conveyor apparatus 22 and 23 (so as to match belt speeds), which therefore dictates toasting and proofing oven lengths to achieve the desired masa dwell times.)

Once the sheet of masa exits the proofing oven 20, it is removed from the conveyor apparatus 23 and guided onto the anvil roller 110 (FIG. 6) by doctor blade 126. As the sheet of masa enters the nip formed between the anvil roller 110 and the die-cutting transfer roller 112, the sheet of masa is cut into the individual tortilla chip preforms 121, which are deposited into the mold cavities provided by the mold cavity elements 47, as shown in FIG. 2.

(Although the above-described processing sequence is preferred for the reasons explained in the Summary of the Invention, there may be instances in which it is desirable to die-cut the masa sheet before toasting and proofing the preforms. In such instances, the speed of processing should be reduced sufficiently to permit a system operator to ensure that proper orientation of the chip preforms is maintained to facilitate subsequent stacking and packaging of the cooked chips.)

The belt assembly 26 transports the tortilla chip preforms 121 in the direction indicated by arrow 46 (FIG. 2). At approximately the portion of the assembly which is circled in FIG. 1 and shown in greater detail in FIG. 2, the belt assembly 26 passes over the upper edge 160 of the oil pan assembly 30 and down into a pool of hot oil which is contained within the oil pan assembly 30. (Hot oil is continuously pumped into and out of the oil pan assembly via inlet and outlet 162 and 164, respectively, and is filtered to maintain oil quality.) At approximately the same location, the links 50 of the upper mold plate belt assembly come down into engagement with the links 40 of the lower belt assembly 26 to confine the tortilla chip preforms within the gap 80 formed therebetween. The lower and upper mold belt assemblies rotate at the same speed and transport the tortilla chip preforms through the hot oil contained within the oil pan 30. The oil is maintained at a temperature on the order of 350° F., and the tortilla chips are maintained within the hot oil for on the order of thirty-five to forty seconds so as to achieve a moisture content of approximately 1.5% by weight and an oil content of approximately 30% by weight.

As the now-cooked tortilla chips ramp up out of the oil pan at the opposite, downstream end thereof, oil will drain from the chips and the mold cavities will open as the links 50 of the upper, mold plate belt assembly 28 rotate away from the links 40 of the lower, mold cavity belt assembly 26, e.g., as at 168. Preferably, the chips are sprayed from below by a high-pressure spray of oil or even just a burst of high-pressure air at 170. This helps ensure subsequent separation from and removal of the cooked tortilla chips from the cavity elements 47.

The downstream transfer assembly 34 picks up the tortilla chips at the downstream end of the conveyor 26 by sucking them up against the transfer pads 134, and then deposits them by slight blowing onto take-away seasoning conveyor 36 to be seasoned and then packaged. It will be appreciated that the tortilla chips are placed onto the take-away conveyor 36 in substantially the same orientation shown in FIG. 2, i.e., arranged with their axes of curvature essentially aligned and with their base edges and apex corners arranged in alternating fashion. This uniform orientation is critical for the subsequent stacking and packaging operations.

Figure 9:
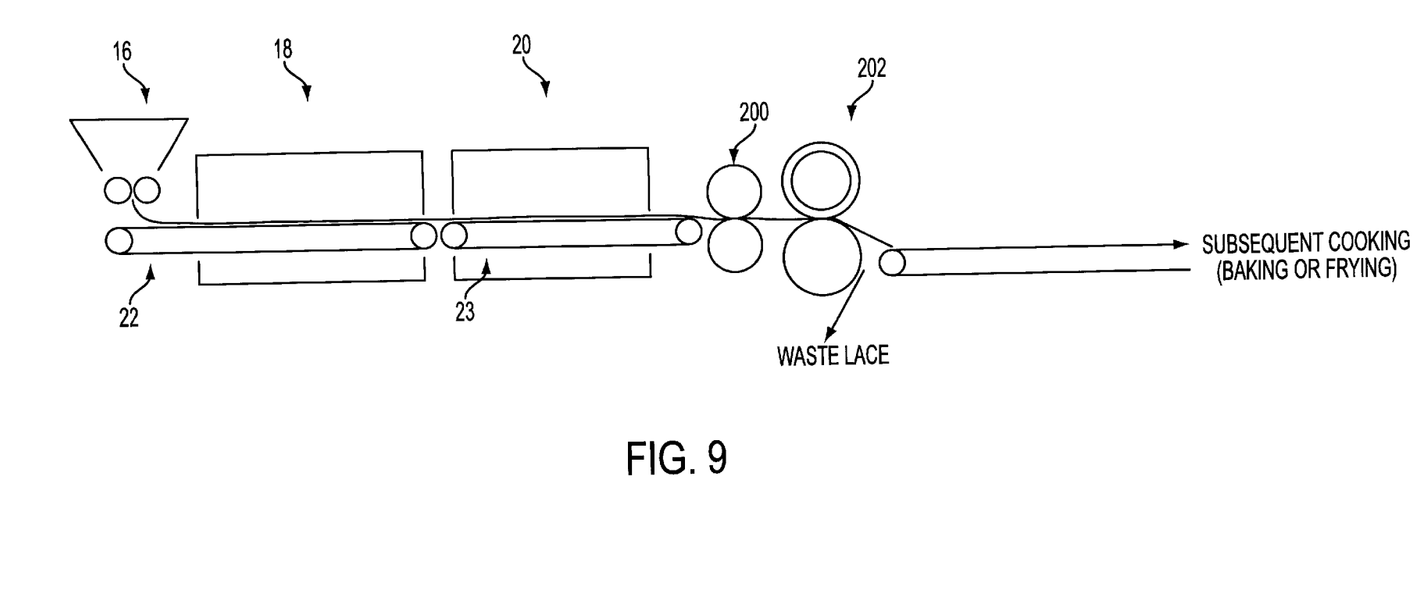
FIG. 9 is a diagrammatic, side elevation view similar to that of FIG. 1 showing an alternate embodiment of the invention.

Finally, as noted above in the Summary of the Invention and as illustrated in FIG. 9 (in which the same reference numerals are used to describe components that are the same as described above), toasting and proofing the entire sheet of masa before die-cutting it facilitates imparting "macroscopic" texture to the chips (e.g., by making them ridged or sinusoidally wavy or even "waffle cut") by passing the toasted and proofed sheet of masa through one or more contoured or corrugated shaping rollers 200 or sets thereof. The shaped sheet of masa would then be die-cut using die-cutting rollers 202. In this embodiment of the invention, the shape imparted to the chips by passing the masa sheet through the shaping rollers may be all the shape that is desired to be imparted to the chips. In that case, the subsequent step of placing the die-cut chip preforms into molds, which imparts other shape characteristics to the chips, may be foregone; the chips would then be cooked to a desired final state by unrestrained frying, baking or other conventional means which will be known to those having skill in the art.

Figure 10:
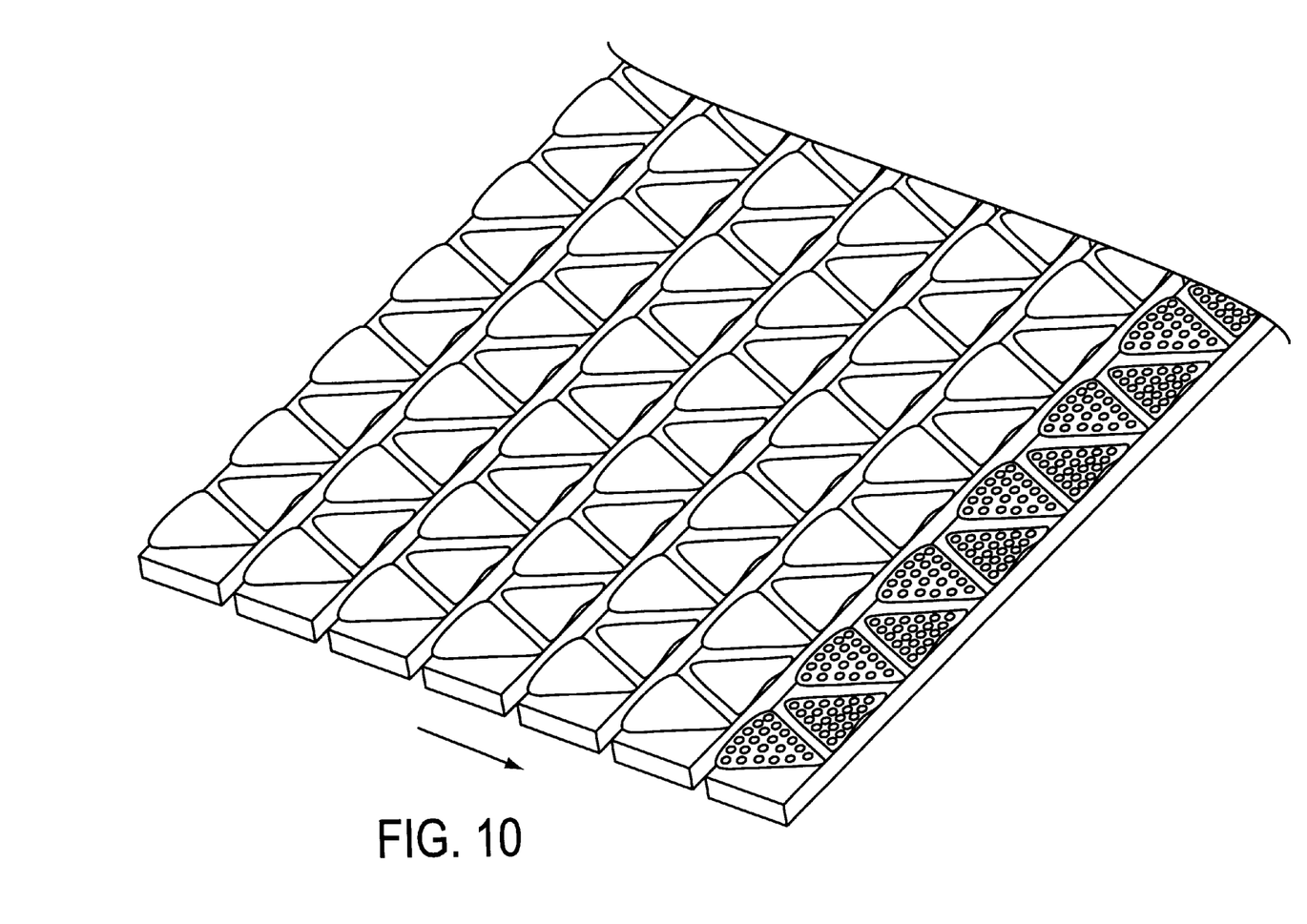
FIGS. 10 and 11 are perspective views illustrating alternative lower, mold cavity conveyor assemblies used to produce chips according to the invention with alternative large-scale curvature configurations.
Figure 11:
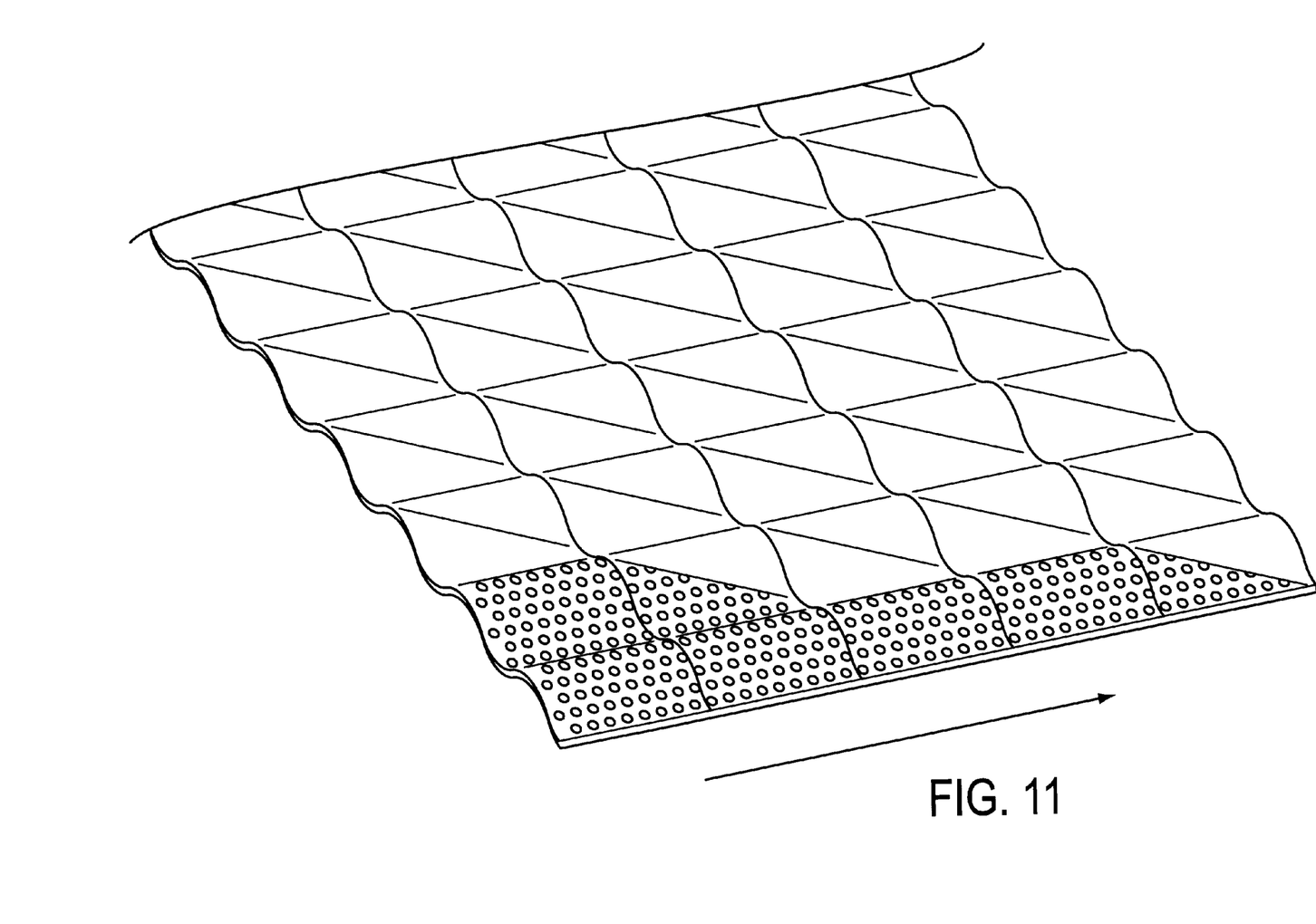

Although the invention has been described in detail above, it will be appreciated that numerous modifications to and departures from the illustrative embodiments will occur to those having skill in the art. For example, whereas the tortilla chips are described above as being curved about an axis extending parallel to one of the edges of the chip, they alternatively may be curved about an axis extending from one corner of the chip to the opposite edge of the chip (i.e., a bisector of the chip). Tortilla chips with such a curvature configuration could be made by shaping the chip preforms on hump-shaped, perforated mold surfaces and restraining the chip preforms with mating concave mold cavities (not shown), as illustrated in FIG. 10. Alternatively, the chip preforms could be given large-scale waviness by shaping them on sinusoidally wavy mold elements, as illustrated in FIG. 11.

Figure 12A:
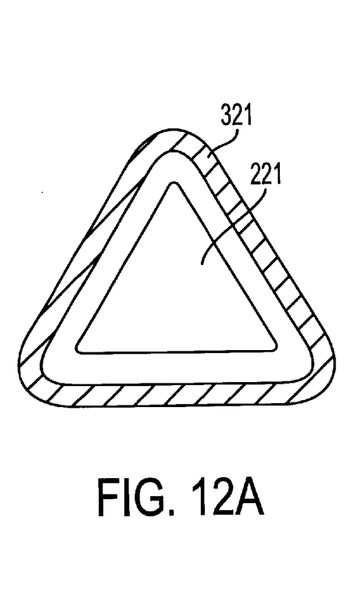
FIGS. 12a–12c are cross-sectional views illustrating cooked snack food chips packaged in canisters which conform generally to the contours or perimeters of the chips.
Figure 12B:
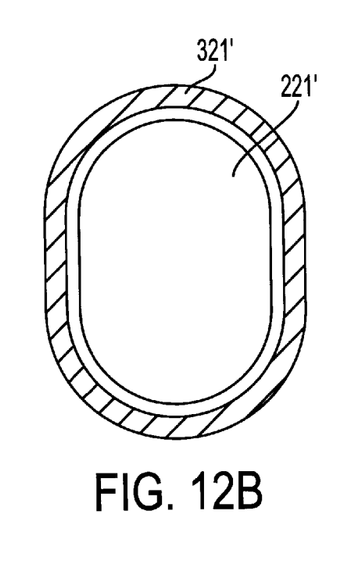
Figure 12C:
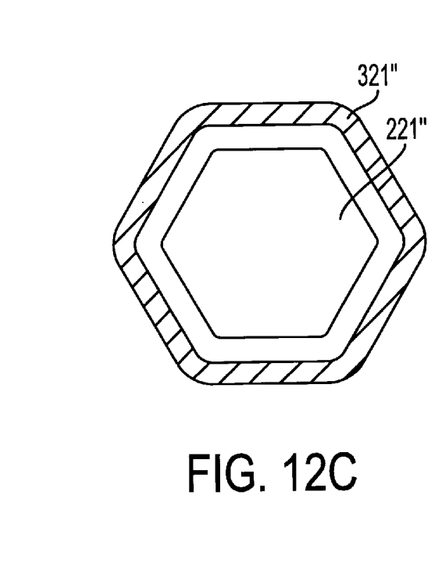

Moreover, the apparatus and method may be practiced using corn meal rather than corn masa to produce tortilla chips having different taste characteristics. The process parameters (toasting time and temperature, proofing time and temperature, and cooking time and temperature) would have to be adjusted accordingly. Additionally, chips other than tortilla chips can be made using the invention, which alternative chips may be triangular or have other shapes such as ovals, squares, rectangles, other polygons, etc. Moreover, it is preferable that the shape of the canister in which the chips are packaged conform generally to the contour or perimeter of the chips, as illustrated in FIGS. 12a–12c. For example, cooked tortilla chips 221 would be packaged in generally triangular canisters 321; cooked fabricated potato crisps 221' (which customarily are oval or elliptical) would be packaged in oval or elliptical canisters 321'; cooked hexagonal snack food chips 321" would be packaged in hexagonal canisters 321"; etc. These and other modifications are deemed to be within the scope of the following claims.

We claim:

1. An assembly for making snack food pieces, said assembly comprising:

a toasting oven configured to receive and convey therethrough a continuous sheet of snack food dough material;

a proofing oven located downstream of said toasting oven and configured to receive said sheet of snack food dough material from said toasting oven and to convey said snack food dough material therethrough;

a frying apparatus located downstream of said proofing oven, said frying apparatus comprising an oil pan assembly and molds configured to immerse snack food piece preforms in oil contained within said oil pan assembly;

a die-cutting transfer roller assembly located intermediate said proofing oven and said frying apparatus, said die-cutting transfer roller assembly configured to cut the snack food piece preforms from the continuous sheet of masa and transfer the preforms to said frying apparatus; and a take-away transfer roller assembly located downstream of said flying apparatus, said take-away transfer roller assembly configured and disposed to remove cooked snack food pieces from said flying apparatus and to transfer the cooked snack food pieces to take-away apparatus for subsequent processing of the cooked snack food pieces.

2. The assembly of claim 1, wherein said molds comprise two-piece molds which are configured to restrain said snack food piece preforms while said snack food piece preforms are immersed in the oil.

3. The assembly of claim 2, wherein said frying apparatus comprises a housing;

a first rotating belt assembly disposed within said housing and comprised of a plurality of first mold elements which form first portions of said two-piece molds; and a second rotating belt assembly disposed within said housing and comprised of a plurality of second mold elements which form second portions of said two-piece molds;

wherein said first and second rotating belt assemblies are disposed in cooperating relationship with each other and in relation to said oil pan assembly such that as said first and second belt assemblies rotate, said first and second mold elements come together to define said two-piece molds and restrain the snack food piece preforms therein; transport the preforms through oil contained within said oil pan assembly; and then move away from each other such that said enclosed molds open and the cooked snack food pieces can be removed therefrom by said take-away transfer roller assembly.

4. The assembly of claim 1, wherein said molds are generally elongated and continuous and restrain a succession of snack food piece preforms therein.

5. The assembly of claim 1, wherein said molds are curved such that snack food pieces cooked within said frying apparatus are curved.

6. The assembly of claim 1, wherein said die-cutting transfer roller assembly is configured to cut generally triangular snack food chip preforms arranged in alternating fashion.

7. The assembly of claim 2, wherein said first mold elements comprise concave mold cavities and said second mold elements comprise convex mold plates which mate with said concave mold cavities and wherein said first and second mold elements are configured such that the two-piece molds formed thereby are generally elongated and continuous so as to restrain a succession of snack food piece preforms therein, whereby said assembly can be operated on a continuous basis to produce a continuous succession of curved snack food pieces.

8. The assembly of claim 7, wherein said die-cutting transfer roller assembly is configured to cut generally triangular snack food piece preforms arranged in alternating fashion, whereby said assembly can be operated on a continuous basis to produce a continuous succession of curved, triangular snack food pieces arranged in alternating fashion.

9. The assembly of claim 1, further comprising a shaping roller assembly located downstream of said proofing oven and configured to impart texture to said continuous sheet of snack food dough material.

10. The assembly of claim 9, wherein said shaping roller assembly is configured to impart macroscopic texture to said continuous sheet of snack food dough material.

* * * * *